US011140813B1

(12) United States Patent
Morrison et al.

(10) Patent No.: US 11,140,813 B1
(45) Date of Patent: Oct. 12, 2021

(54) MOISTURE AND VEGETATIVE HEALTH MAPPING

(71) Applicant: SCYTHE ROBOTICS, INC., Longmont, CO (US)

(72) Inventors: John Gordon Morrison, Longmont, CO (US); Davis Thorp Foster, Boulder, CO (US); Isaac Roberts, Longmont, CO (US)

(73) Assignee: SCYTHE ROBOTICS, INC., Longmont, CO (US)

( * ) Notice: Subject to any disclaimer, the term of this patent is extended or adjusted under 35 U.S.C. 154(b) by 260 days.

(21) Appl. No.: 16/254,650

(22) Filed: Jan. 23, 2019

Related U.S. Application Data

(60) Provisional application No. 62/621,255, filed on Jan. 24, 2018.

(51) Int. Cl.
*G01C 22/00* (2006.01)
*G05D 1/00* (2006.01)
(Continued)

(52) U.S. Cl.
CPC .......... *A01C 21/007* (2013.01); *A01B 69/004* (2013.01); *A01C 7/06* (2013.01); *A01C 7/102* (2013.01); *A01C 23/007* (2013.01); *A01M 7/0089* (2013.01); *G05D 1/0246* (2013.01); *G05D 1/0257* (2013.01); *G06N 20/00* (2019.01); *G06T 7/0012* (2013.01); *G06T 7/70* (2017.01); *G06T 17/05* (2013.01); *G05D 2201/0201* (2013.01); *G06T 2207/10004* (2013.01);
(Continued)

(58) Field of Classification Search
CPC ........... A01C 21/007; A01C 7/06; A01C 7/00; A01C 7/02; G06T 7/70; G06T 7/001; G06T 17/05; G06N 20/00; A01B 69/004; G01N 33/0098
USPC ...................................... 701/24, 50
See application file for complete search history.

(56) References Cited

U.S. PATENT DOCUMENTS 8,849,523 B1 * 9/2014 Chan .................... B64D 1/18
701/50
10,037,038 B2 7/2018 Sandin et al.
(Continued)

FOREIGN PATENT DOCUMENTS

WO WO-2015/173825 A1 11/2015
*Primary Examiner* — Mahmoud S Ismail
(74) *Attorney, Agent, or Firm* — Moser Taboada

(57) ABSTRACT

A vegetative health mapping system which creates two- or three-dimensional maps and associates moisture content, soil density, ambient light, surface temperature, and/or additional indications of vegetative health with the map. Moisture content is inferred using radar return signals of near-field and/or far-field radar. By tuning various parameters of the one or more radar (e.g. frequency, focus, power), additional data may be associated with the map from subterranean features (such as rocks, soil density, sprinklers, etc.). Additional sensors (camera(s), lidar, IMU, GPS, etc.) may be fused with radar returns to generate maps having associated moisture content, surface temperature, ambient light levels, additional indications of vegetative health (as may be determined by machine learned algorithms), etc. Such vegetative health maps may be provided to a user who, in turn, may indicate additional areas for the vegetative health device to scan or otherwise used to recommend and/or perform treatments.

20 Claims, 8 Drawing Sheets

(51) Int. Cl.

| | |
|---|---|
| *A01C 21/00* | (2006.01) |
| *G06T 7/00* | (2017.01) |
| *G06T 7/70* | (2017.01) |
| *G06T 17/05* | (2011.01) |
| *G05D 1/02* | (2020.01) |
| *A01B 69/00* | (2006.01) |
| *A01C 23/00* | (2006.01) |
| *A01C 7/06* | (2006.01) |
| *A01C 7/10* | (2006.01) |
| *A01M 7/00* | (2006.01) |
| *G06N 20/00* | (2019.01) |
| *G06F 7/70* | (2006.01) |
| *G06F 19/00* | (2018.01) |
| *G06G 7/00* | (2006.01) |
| *G06G 7/76* | (2006.01) |

(52) U.S. Cl.
 CPC .............. *G06T 2207/10028* (2013.01); *G06T 2207/10044* (2013.01); *G06T 2207/20081* (2013.01); *G06T 2207/30188* (2013.01)

(56) References Cited

U.S. PATENT DOCUMENTS

| | | | |
|---|---|---|---|
| 10,705,185 B1* | 7/2020 | Lien | G01S 13/867 |
| 2004/0068352 A1* | 4/2004 | Anderson | A01B 69/008 |
| | | | 701/25 |
| 2011/0047867 A1* | 3/2011 | Holland | G01J 3/36 |
| | | | 47/1.5 |
| 2016/0223506 A1* | 8/2016 | Shriver | G06K 9/00657 |
| 2017/0020087 A1 | 1/2017 | Younis et al. | |
| 2017/0359943 A1* | 12/2017 | Calleija | A01M 21/043 |
| 2018/0213731 A1 | 8/2018 | Wykman et al. | |
| 2018/0330487 A1* | 11/2018 | Cohen | G06K 9/4604 |

* cited by examiner

MOISTURE AND VEGETATIVE HEALTH MAPPING

CROSS REFERENCE TO RELATED APPLICATIONS

This application claims the benefit of the filing date under 35 USC 119(e) of provisional applications entitled "Moisture and Vegetative Health Mapping" Ser. No. 62/621,255, filed on Jan. 24, 2018, the entire contents of which is fully incorporated herein by reference.

BACKGROUND OF THE INVENTION

Vegetative health is dependent on a number of factors, such as moisture content, light, temperature, etc. For example, both overwatering and under watering vegetation can result in poor vegetative health, including plant death. To ensure optimal vegetative health, a proper amount of water needs to be maintained. Generally, to detect moisture levels of an area, individual probes are inserted into the ground. Though these probes provide an indication of the moisture level of the immediately surrounding soil, they do not provide a continuous mapping of the area. Furthermore, permanent probes require their own source of power and data transfer, not to mention the fact that the probes are burdensome to install and are subject to breaking (e.g. by getting hit by a lawn mower or by oxidative degeneration over time). Temporary probes suffer from the same problem, and additionally require an operator to manually take measurements and record moisture values. Additionally, such probes do not provide any insight into other factors of vegetative health, such as presence of pests, lack of growth, poor growth, presence of weeds, and the like.

BRIEF DESCRIPTION OF THE DRAWINGS

The invention will now be described, by way of example, with reference to the accompanying drawings, where like numerals denote like elements, a leftmost numeral indicates the original figure in which the element is found, and in which.

DETAILED DESCRIPTION OF THE INVENTION

Figure 1:
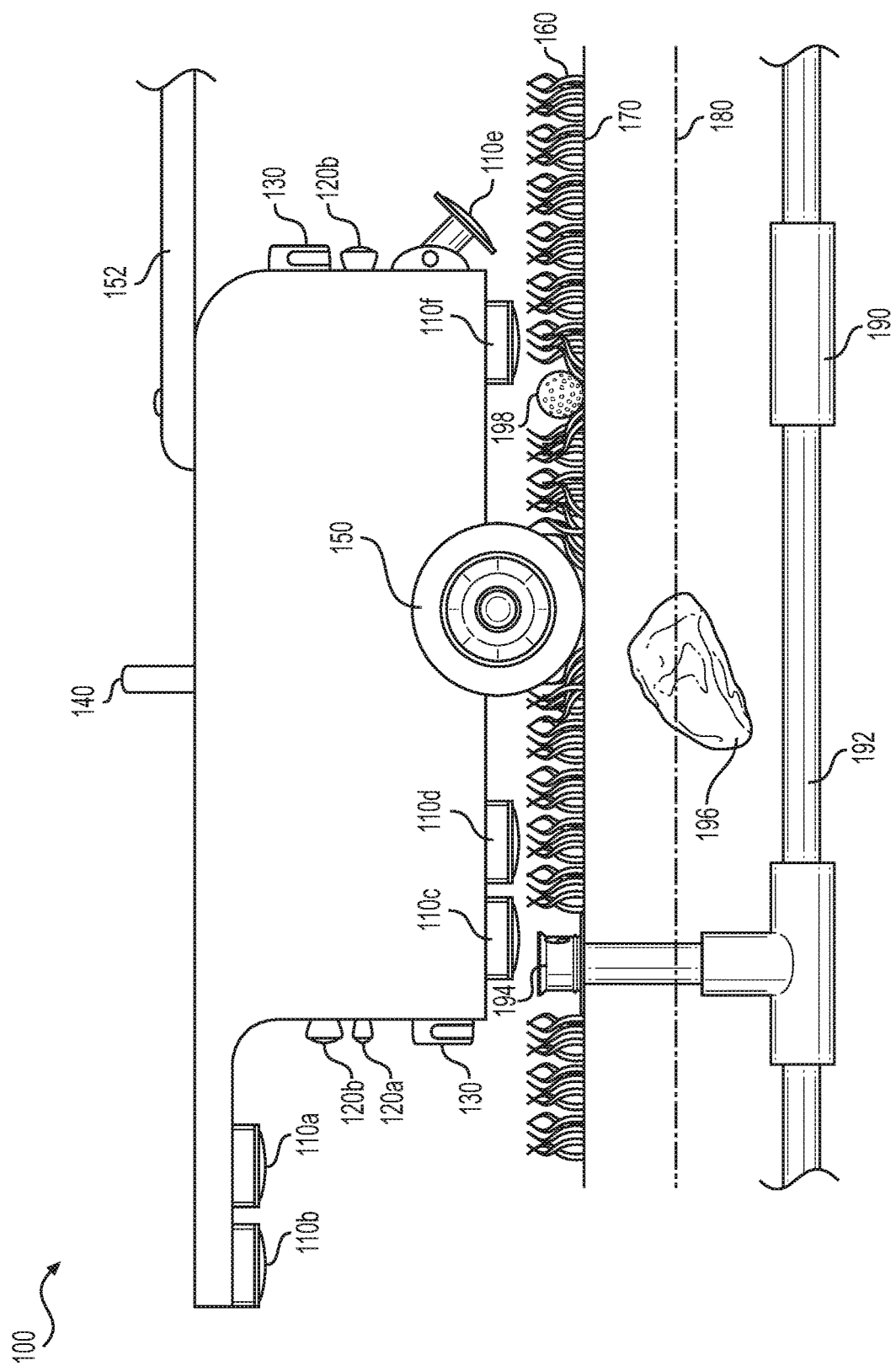
FIG. 1 presents a side view of an example vegetative health device as described herein, including a view of subterranean objects within the vicinity of the device.

The following detailed description describes techniques (e.g. methods, processes, and systems) capable of creating two or three-dimensional vegetative health maps, as well as techniques for allowing a user to interact with such maps to monitor and improve vegetative health. As above, one factor which is indicative of vegetative health is moisture levels (or content) of the vegetation itself and/or any surrounding soil. Ensuring proper moisture levels may be dependent on the type of vegetation (e.g. some plants require more or less than others). A higher or lower moisture level than optimal may negatively impact health of the plants. Additional indicators of vegetative health are described in detail below (such as presence of pests, poor growth, lack of growth, presence of weeds, and the like). In addition to moisture levels, vegetative health may comprise a multitude of other indicators. Such techniques and system described herein may further recognize those other indicators and provide remedies to improve vegetative state (either autonomously, or by providing indication on the map created for a caretaker). As non-limiting examples, herbicides may be provided where weeds are detected, fertilizer in areas of poor growth, seed in areas of no growth (where expected), insecticides, and the like. Further, since the maps are updated from time to time, impact of such treatments can be determined for adjusting recommended treatments (increasing or decreasing watering, increasing or decreasing seed, fertilizer, pesticide, herbicide, etc.). By creating a three-dimensional vegetative health map of an area as described by the processes and systems described herein, landscapers, caretakers, superintendents, and managers can ensure that all areas of vegetation remain optimally healthy.

As one example, such a system may be used by golf course caretakers to ensure that all areas of a golf course are properly watered and that the course remains healthy. A three-dimensional vegetative health map created by any system or process as described herein, and made available to such a caretaker, may indicate to the caretaker broken sprinklers, malfunctioning sprinklers, over and under-watered areas, areas of poor growth, areas of no growth, areas having pests, weeded areas, and the like. Additionally, or alternatively, by creating maps associated with different times of the day and/or times of a year, such a caretaker may adjust watering levels, as well as other vegetation treatments, to optimize moisture content and health of the vegetation throughout the year.

Continuous moisture levels may be determined without contacting the ground, for example, by use of near-field and/or far-field radar attached to a vegetative health device which traverses an area of interest. Such a vegetative health device may traverse an area, for example, by mechanically coupling to a ground vehicle, such a mowing device, via an attachment (e.g. a pipe clamp), pushed manually by an individual to ensure desired coverage, or operated under its own power either autonomously, or by remote operation (e.g. powered under its own locomotive force with controls provided by a remote operator).

Radar comprises emission of an electromagnetic signal and a corresponding detection of a reflected, coupled, or scattered signals off a target. The reflected signals (or lack thereof) may be used to determine the moisture content of the surface (e.g. far-field reflections may be increased due to higher scattering from moisture, whereas near-field returns may be attenuated as a function of moisture content due to water's impact on the dielectric constant of soil). As will be described in more detail herein, multiple radar devices may be disposed about the vegetative health device at varying positions and/or angles. While radar pointed directly at the ground (on-nadir) may have an increased sensitivity, radar angled (e.g. inclined between 0 and 90 degrees off-nadir, including 45 degrees) may provide a larger field of view for the radar sensor, thus ensuring continuous moisture mapping. By using multiple radar transmitters and receivers per device and/or having a fleet of devices, it is possible to make continuous determinations of moisture levels over a user specified area. Additionally, or alternatively, multiple radar receiver antennae may be used per radar emitter, the various radar antennae having one or more polarizations. In such examples, moisture content may be determined by measuring the relative, or differential, power of the reflected signals from different polarizations.

In addition to the one or more radar on-board such a device, in some examples, the device may also comprise one or more additional sensors, such as, but not limited to, LIDAR(s), image sensors (RGB cameras, monochrome cameras, stereo cameras, depth cameras, infrared cameras, ultraviolet cameras, RGB-D cameras, IR cameras, etc.), inertial measurement units (IMUs), accelerometers, gyroscopes, magnetometers, global positioning systems (GPS), ultrasonic transducers (e.g. SONAR), wheel encoders, and the like. In some examples, two or more image sensors may have differing fields of view (e.g. wide and narrow) and have an associated baseline. Environment features, including depth estimates, may be determined based on multi-view geometry techniques of sensor data from the multiple image sensors and/or otherwise provided with depth sensors provided.

Sensor data from such sensors may be used to create a three-dimensional map of the area through which the device passes. Multiple mapping techniques may be used to construct a three-dimensional map based on the acquired sensor data including, but not limited to Simultaneous Localization and Mapping (SLAM), Kalman filters (Unscented Kalman Filters, Extended Kalman Filters, etc.), bundle adjustment, sliding window filters, occupancy grids, and the like. Such a map may be stored as a signed distance function (SDF), truncated SDF (TSDF), triangle mesh, mosaics, or other data structure. Use of voxel hashing may improve memory requirements for both storage and raycasting. Vegetative health indicators (such as moisture content) may then be associated with the map generated, or otherwise determined as part of the three-dimensional map generation (e.g. simultaneously). In any of the above examples, it may be possible to estimate a ground plane to aid in mapping, determining moisture levels, and the like.

In those examples, where multiple measurements are made for a single location (e.g. due to multiple measurements by a single vegetative health device and/or multiple measurements from a fleet of vegetative health devices), moisture content, soil density, ambient temperature values, amongst other indications (or indicators) of vegetative health may be combined and associated with the map based on a weighted average. Such weighting may be based on, for example, a reliability of the sensor modality, a number of measurements, how recent the measurement was performed, a time of day, time of year, time since a last watering, alternate and/or additional data sources (such as color, humidity, temperature, etc.), an uncertainty, a covariance, and the like. Further, by operating as a fleet of devices, vegetative health estimation may be more consistent, as moisture content changes with the time of day, vegetation color may change over a course of a year, and the like. By having multiple vegetative health devices simultaneously determining vegetative health (including moisture content) over a wide area, it is possible to minimize differences between measurements, thereby providing a more uniform and/or accurate estimate.

Associations of moisture, soil density, temperature levels, additional indications of vegetative health (or other data to display to a user, such as actionable items, wind, pressure, etc.) of such a three-dimensional map may be indicated by shading, varying colors (e.g. red for low moisture and blue for high moisture), contour lines, etc. In some examples, it may be sufficient to store a UTM grid of GPS coordinates with associated vegetative health indicators (or other data). In such examples, additional computing power may not be required, as no raycasting or complex computations are necessary for indexing a position in the map.

In some examples, the vegetative health device may comprise one or more additional health sensors, such as, but not limited to, thermal cameras, bolometers, pyrometers, ambient light sensors, and the like. Sensor data from these additional health sensors may be associated with the three-dimensional map.

Additionally, or alternatively, sensor data from any one of the one or more sensors may be used in a machine learning algorithm for determining vegetative health. One non-limiting example of machine learning algorithms is an Artificial Neural Network (ANN). ANNs are biologically inspired algorithms which pass input data through a series of connected layers to produce an expected output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters. Here, various neural networks may be trained to output vegetative health based on at least a portion of the sensor data. Such output may then be associated with the two- or three-dimensional map. For example, input having a known output may be provided to the ANN to adjust various internal parameters, such that when known input is given, an estimated output is provided. As a particular example, images may be taken of areas having known vegetative health indicators (such as moisture content levels, presence of pests such as insects and varmints, presence of weeds and/or invasive species, lack of growth, poor growth, and the like). By backpropagating the known vegetative health indications based on the input images (and/or other sensor data), an ANN can be trained to output vegetative health indications based on input sensor data.

In some examples, such machine learning algorithms (including artificial neural networks), may be used to segment, detect, and/or classify sensor data. Segmentation is the process of extracting useful information from sensor data (e.g. separating different objects from each other and a background in image data). Classification is the process by which sensor data is associated with a label. For example, image and/or radar data may be segmented based on different objects in the environment and subsequently classified, such that the segmented and classified data indicates the existence of plants, golf balls, rocks, pipes, branches, leaves, or any other object detectable by any of the sensor data. In some examples, the same, or similar, techniques (detection/ classification/segmentation/etc.) may be used, generally, to determine areas of poor vegetative health. As non-limiting examples, segmentation of sensor data (e.g., from the one or more cameras on the device, radars, and/or lidars, etc.) may indicate no vegetation where vegetation is expected (e.g., as provided by a user, or otherwise), areas of discoloration of vegetation (which may be with respect to an expected coloration (or previously observed coloration)), a deviation of sensor returns (e.g., camera, lidar, radar, sonar, etc.) as compared to an expected return associated with the area, and the like. In at least some examples, such comparisons may be dependent on a time of year, weather conditions, a most recently previously observed coloration, and the like. Additionally, or alternatively, detectors, segmentation algorithms, classification algorithms, etc. may be used to determine the presence of unwanted species (invasive species, weeds, etc.) and/or varmints, insects, etc. based at least in part on the sensor data. Such segmented and classified data may be used in both generating the three-dimensional map, as well as localizing the vegetative health device to the map.

Although discussed in the context of neural networks, any type of machine learning may be used consistent with this disclosure. For example, machine learning algorithms may include, but are not limited to, regression algorithms (e.g., linear regression or logistic regression), least squared optimizations, Bayesian algorithms, clustering algorithms (e.g., k-means, k-medians, etc.), least squares (including linear and non-linear, for example), deep learning algorithms (including Deep Boltzmann Machine (DBM) and Convolutional Neural Network (CNN)), Principal Component Analysis (PCA), support vector machines, random forests, etc.

As time impacts moisture levels (e.g. moisture is absorbed or evaporates over the course of a day), sensor data from any one or more of the sensors above may be associated with a timestamp. Multiple maps may be created based on, for example, time of day, time of the year, and the like. By creating maps consistent with a time of day and/or time of year, a landscaper or caretaker may be able to quickly determine vegetative health and/or if treatment has improved. Such time comparisons may also be used to determine actionable items. For example, if one area in a map has a degrading vegetative health indicator associated with an increasing moisture content over time, it may be indicative of a leak requiring patching, or a watering profile in need of adjustment, though any other actionable item is contemplated. Further, as above, previously generated maps may be compared to current sensor data to determine if a deviation exists (e.g., more than a threshold amount) in the associated sensor returns (e.g., regions of grass having poor vegetative health may comprise turning brown in image data, differing radar intensities and/or cross-sectional areas due to lower amounts of moisture, etc.).

In some examples, such maps may be determined on the device. Additionally, or alternatively, sensor data from any of the one or more sensors may be stored on the device for processing on another, more powerful, system. In such an example, memory, processing power, and weight of the vegetative health device may be minimized. In additional or alternative examples, such as those in which the vegetative health device is dragged behind a large mower, data may be transferred (either wired or wirelessly) to a more powerful computing device located on the mower, or elsewhere, for processing and/or upload.

Once a vegetative health map is created, it can be made available to a user (e.g. by direct data transfer or hosted on a cloud based server). By associating vegetative health indicators of an area with varying shading, coloring, contour lines, etc., such a user may be able to easily glean vegetative health and/or instruct the vegetative health device to collect additional measurements. Additionally, or alternatively, any such determinations indicative of poor vegetative health may also have an associated expected area (e.g., in $m^2$), which may be determined based on the generated map. Once determined, an amount of water, herbicide, pesticide, insecticide, fertilizer, seed, etc. may be precisely calculated (e.g., in accordance with recommended application of herbicide, pesticide, fertilizer, seed, etc. as recommended per unit area), either by the device or computing device in communication with the device, and communicated to a care taker for application and/or applied to the vegetation by the device autonomously. By viewing multiple maps over a period of time, such a user may be able to determine if treatment has improved an area of vegetation.

Though described herein with respect to golf courses for ease of illustration, there is no intention to limit the disclosure to golf courses alone. In fact, such a system may be equally used with respect to orchards, farms, landscapes, and any other area of vegetation requiring monitoring of vegetative health. Furthermore, though described as a device to be dragged, pulled, pushed, or moved under its own locomotive power near a surface, the disclosure isn't so limiting. Any of the techniques, processes, and systems described herein may be used in conjunction with other modes of transport (including, but not limited to attached to aircraft, helicopters, multirotors, watercraft, bicycles, tractors, automobiles, motorcycles, and the like), as well as used alone as a drone, unmanned aircraft vehicle, unmanned watercraft, or the like. Details of such a system are described in detail below with respect to the figures.

FIG. 1 illustrates a vegetative health device 100 for creating three-dimensional vegetative health maps. As shown, such a vegetative health device 100 may have one or more radar devices 110 (i.e. radar transmitter/receiver pairs, or simply radar). In some examples, the radar devices 110 may be disposed about the system in a far-field configuration (e.g. the transmitter/receiver pair is located on the order of multiples of the wavelength, for example, three feet or more, from a surface as illustrated by radar devices 110a, 110b), or a near-field configuration (e.g. the transmitter/receiver pair is located close to a surface, e.g. 0.5 ft, as illustrated by radar devices 110c-110f). Use of both near-field and far-field may improve moisture content determination, as far-field may indicate moisture content due to increased scatter in the far-field from moisture in the surface, while near-field may indicate moisture content from the fact that moisture increasingly capacitively couples the radar signal to ground. Additionally, or alternatively, any radar transmitter and receiver may be disposed apart from one another (e.g. from directly touching to on the order of several feet). Such spacing may be based, at least in part, on a wavelength of the transmitted signal and may increase sensitivity to moisture content. Furthermore, in at least one example, one transmitter may be associated with more than one receiver. In some examples where multiple receivers are used, each radar receiver antenna may have a different polarization. As a non-limiting example, transmissions of radar device 110f may be received by any one or more of radar devices 110a-e.

Any one or more of the radar devices 110 may operate in various modes and/or at different frequencies. For example, any of the one or more radar devices 110 may operate in the ISM band (such as around 900 MHz or around 2.4 GHz) or Ultra Wide Band (UWB), though any frequency range is contemplated, including two- or multi-band. Any of the one or more radar devices 110 may be configured as Continuous Wave (CW), monopulse, wide-band pulse, and/or Frequency Modulated Continuous Wave (FMCW). In some examples, the radar device 110 may be a phased array radar. Further, in some examples, at least one radar device 110 (preferably in a near-field configuration) may perform time domain reflectometry (TDR) by sending pulses of electromagnetic radiation. In some examples, different wave forms may be used to determine different physical parameters of the vegetation and underlying soil (e.g. moisture content, soil density, vegetation thickness (e.g. grass or crop height), etc.). As non-limiting examples, a radar device 110 may use square waves, triangle waves, sinusoidal waves, or signal modulation using any waveform, and the like. In some examples where multiple radar devices 110 are used, different modes may be used for different purposes on each radar device 110. For example, an FMCW may be used for determination of distance for compensation and calibration, whereas near-field TDR may be used to determine moisture and other soil parameters.

In some examples, the transmitted signal from a radar device 110 may be optimized for a certain amount of ground penetration. For example, any one or more of frequency (or wavelength), power, focus, etc. may be adjusted to achieve a different depth of penetration. Such adjustments may be performed from time to time as the vegetative health device 100 traverses an area and tuned for subterranean object detection and/or soil density estimation. As illustrated in FIG. 1, by adjusting any of the one or more parameters, different objects may be detected by the radar device 110. As shown, any one or more of the radar may detect vegetation 160, objects (such as a golf ball 198, sprinkler head 194, leaves, branches, roots, etc.), a ground surface level 170, a subterranean rock 196, a change in soil density and/or moisture content 180, underground piping 192, pipe coupling 190, and the like. In such a manner, the vegetative health device 100 may discern differences between vegetation 160, such as, for example, the difference between tees, rough, fairway, and holes of a golf course.

In some examples, at least one of the radar transmitters and/or receivers may be angled with respect to a direction of travel of the vegetative health device, such as illustrated by radar device 110e. In some examples, the radar device 110 may be inclined at 45 degrees relative to the surface, though any inclination between 0 and 90 degrees is contemplated. By inclining the radar device, a greater field of view is established for mapping and moisture estimation. Such an increased field of view may ensure a continuous mapping of moisture content (and/or soil density, etc.).

In addition to the one or more radar devices 110, the vegetative health device may additionally, or alternatively, comprise lidar(s) 130, image sensor(s) 120, Global Positioning System(s) (GPS), inertial measurement unit(s) (IMU), accelerometer(s), gyroscope(s), magnetometer(s), wheel encoder(s), ultrasonic transducer(s), thermal imagers, ambient light sensor(s), time of flight sensors, barometer(s), bolometer(s), pyrometer(s), and the like. Any of the radar devices 110 and additional sensors (e.g. lidar 130 and image sensors 120) may be disposed about the vegetative health device 100 in poses (i.e. position and orientations) determined to optimize a field of view. Image sensors 120 may comprise narrow field of view cameras 120a and wide-angled cameras 120b. Multiple image sensors 120 may be disposed about the vegetative health device 100 to create various baselines (including dual baselines). As will be described in detail below, sensor data from such sensors may both aid in determination of vegetative health, as well as creation of the vegetative health maps.

Figure 3A:
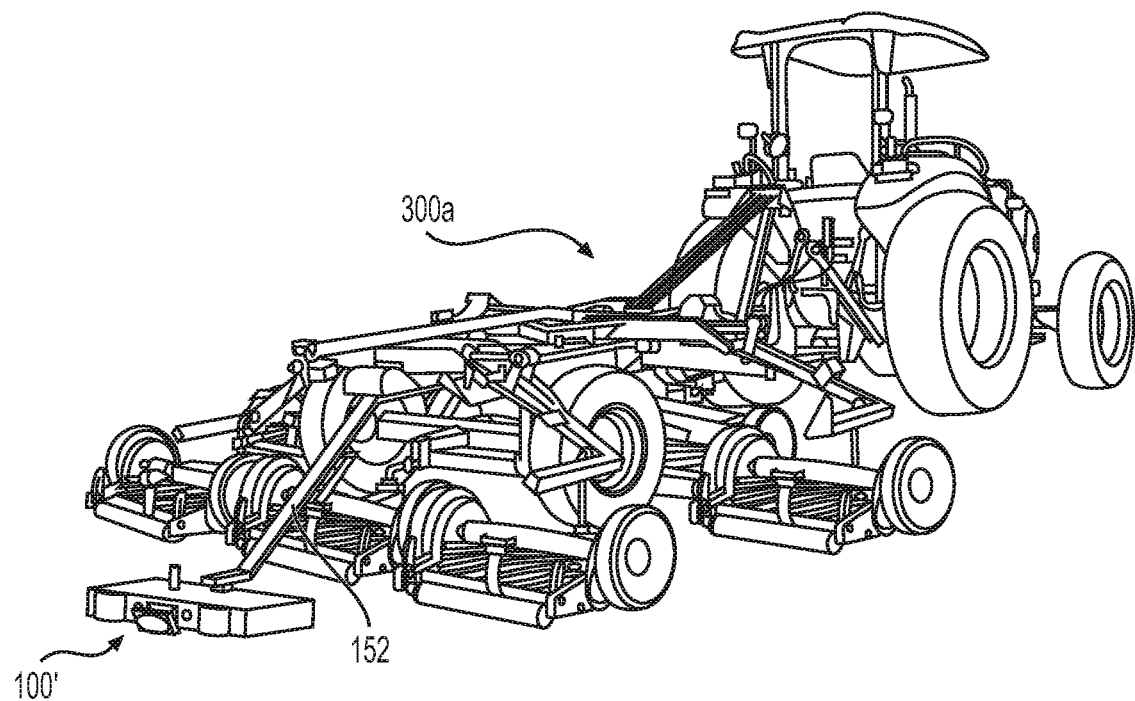
FIG. 3A illustrates the example vegetative health device as shown in FIG. 1 being pulled by a golf course mower.

As shown, the vegetative health device 100 may comprise a coupling 152 to mechanically couple the vegetative health device 100 to a vehicle, such as a mower, tractor, etc., to pull (or push) the vegetative health device 100 over an area. In other examples, the coupling 152 may be used by an individual to push or pull the vegetative health device 100. In some examples, the vegetative health device 100 may have one or more wheels 150 (e.g. one, two three four, or more). In some examples, the coupling 152 may provide sufficient tension such that when coupled, the vegetative health device 100 may remain suspended above the ground (as illustrated in FIG. 3A), despite not having any wheels 150. In those examples, (such as those examples where the vegetative health device 100 is coupled to a mower or scythe), the vegetative health device 100 may be located behind the vehicle to ensure consistency of measurement, as vegetation 160 scanned behind the vehicle has the same height after mowing, and to reduce any potential electromagnetic interference from the vehicle. The vegetative health device 100 may be releasably coupled to the vehicle such as, for example, by a pipe clamp (not shown), or similar attachment mechanism. Using such an attachment (or mechanical coupling), the vegetative health device 100 is able to easily connect and be secured to the vehicle. In some examples, such a mechanical coupling may also provide communicative coupling. For example, a wired or wireless transmission may relay data (e.g. sensor data from the one or more sensors) from the vegetative health device 100 to a more powerful computing system located on the vehicle.

Though not illustrated in FIG. 1, the vegetative health device 100 may alternatively move under its own power. In such a configuration, the vegetative health device 100 may comprise a motor (electric, gasoline powered, hydrogen powered, solar powered, etc. and/or combinations thereof) capable of causing the one or more wheels 150 to move (including, but not limited to accelerations and steering). In one example such configuration, the vegetative health device 100 may move either autonomously (by planning paths through an environment based at least in part on waypoints (or coordinates) along such planned paths provided either by a user or determined to ensure every point in the map, or geolocation provided by a user as a series of coordinates, is covered) and/or via commands received from a user remotely (such as, for example, as a remote control device and/or through an interface in a web browser or mobile application).

One or more antennae 140 located on the vegetative health device 100 may serve to relay communication signals and/or data to and from the vegetative health device 100. As non-limiting examples, such signals data may comprise any portion of sensor data from the one or more sensors (raw, compressed, downsampled, output of one or more machine learned models (such as feature maps), representations thereof, and/or otherwise) and/or control signals to operate the device, etc.

Figure 2:
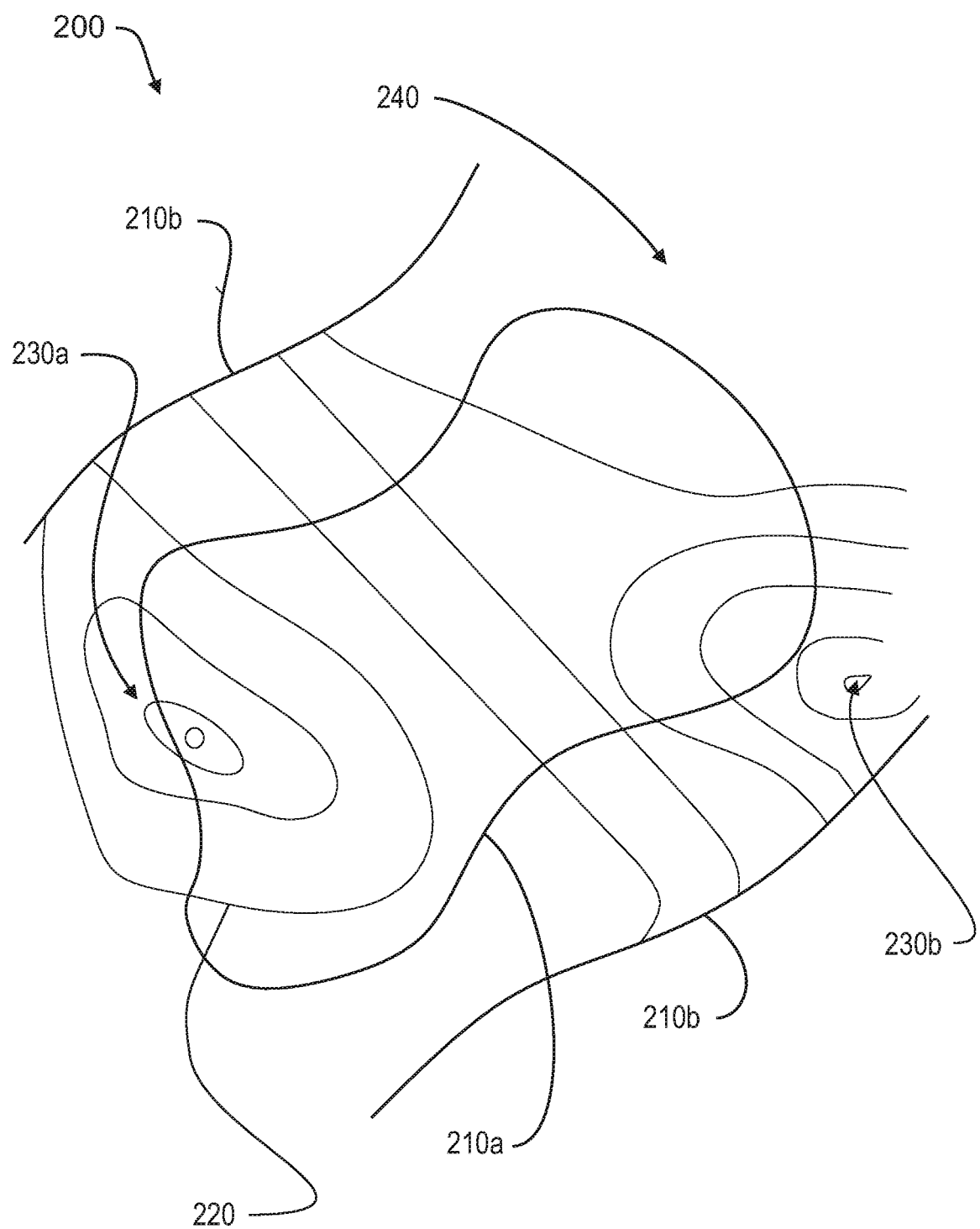
FIG. 2 illustrates an example three-dimensional vegetative health map of a single hole of a golf course which may be created in accordance with the devices and methods described herein, where contours indicate moisture levels.

FIG. 2 illustrates an example three-dimensional vegetative health map 200 as may be created by any system or method as described herein. For illustrative purposes, the three-dimensional vegetative health map 200 shows a single hole of a golf course. Boundaries 210a, 210b between different vegetation (e.g. demarcating a fairway 210a and a rough 210b) may either be provided by a user, third party database, and/or determined based on mapping directly (e.g. differences in sensor data from different vegetation may be used to create such boundaries 210 and/or combined with a confirmation from a user, confirmation from a machine learned model, or the like). As a non-limiting example, a three-dimensional map may be created and regions of differing sensor returns may be clustered, or otherwise grouped together. Such clusters may then be presented to a user to determine whether the differing regions correspond to different vegetation (e.g., fairway v. rough on a golf course) or regions having different vegetative health (a region of grass in good health and another region in poor health). In at least some examples, such determinations (whether the regions correspond to different vegetation or represent a region having degraded vegetative health) may be made by a computing device (such as the vegetative health device) by comparing various modalities of sensor data and/or relying on one or more machine learned models trained to output a type of vegetation. As a non-limiting example, comparisons of image data may indicate that vegetation in two regions are within a threshold of one another, whereas radar data may indicate a difference above some threshold. In such an example, one or more systems may determine that the differing region corresponds to a region of degraded vegetative health of the same type of vegetation. Any other multi-modal determinations are contemplated (image to image, image to radar, lidar to radar, lidar to image, and the like, whether as raw data or comparing outputs of other algorithms, such as detections, segmentations, classifications, feature maps, and the like).

The three-dimensional vegetative health map 200 may be made available to a user either directly from the vegetative health device or from a cloud based server. Various methods may be used to indicate vegetative health of various regions, such as, but not limited to, moisture levels, poor growth, no growth, presence of weeds or invasive species, presence of pests, or any other user selected environmental feature. As non-limiting examples, moisture levels may be indicated on the map displayed to the user by color (where differing colors indicate differing moisture levels), shading (higher or lower shading areas indicating higher moisture levels), contour lines (where a density of lines may indicate moisture levels), and the like. The same and/or similar techniques may be used to indicate other information regarding vegetative health. In at least some examples, differing aspects of vegetative health may be displayed simultaneously by using differing techniques for different indicators. As a non-limiting example, moisture levels may be indicated by contour lines, presence of pests indicated in shades of red, poor growth indicated in shades of brown, and the like.

As shown in FIG. 2, moisture levels are indicated by contour lines 220. By providing vegetative health as color, shading, contour, etc. a user viewing such a three-dimensional vegetative health map may be able to quickly glean vegetative health of an area. For example, as illustrated in FIG. 2, high areas of contoured lines 230a, 230b may indicate that several sprinklers are leaking from being destroyed by a lawn mower. Similarly, area 240, with low density of contours may indicate that water is not being delivered to the area, the area is more exposed to the sun, or otherwise the vegetation is not receiving sufficient amount of water. The user, such as a caretaker or landscaper, may, upon seeing the map, check plumbing to the area and/or increase watering levels to the area in order to rectify the dry area and improve vegetative health.

In some examples, the three-dimensional vegetative health map 200 may indicate more than simply moisture content. For example, as described in detail below, the three-dimensional map may also be associated with weather data, surface temperatures, ambient light, and estimations of vegetative health from accumulated sensor data. Such data may be presented similarly to a user and/or combined to depict the interaction with one another.

FIG. 3A depicts an example in which a vegetative health device 100' (such as the vegetative health device 100 shown in FIG. 1) is attached to an object, such as a ground vehicle, capable of pulling or pushing the vegetative health device 100'. As illustrated, because the vegetative health device 100' is attached rigidly to a mower 300A by a coupling 152, the vegetative health device 100' may be suspended above the ground, without the need for wheels. As such, additional electromagnetic interference (EMI) may be reduced, as well as ensuring a consistent height above the ground. Additionally, or alternatively, the vegetative health device 100' may be wired or wirelessly coupled to a more powerful computerized system on the mower 300A. As such, a more powerful computerized system on the mower 300A may compute the three-dimensional maps and/or upload sensor data (raw, compressed, downsampled, or representations thereof) to another computerized system (such as a cloud based server, etc.).

Figure 3B:
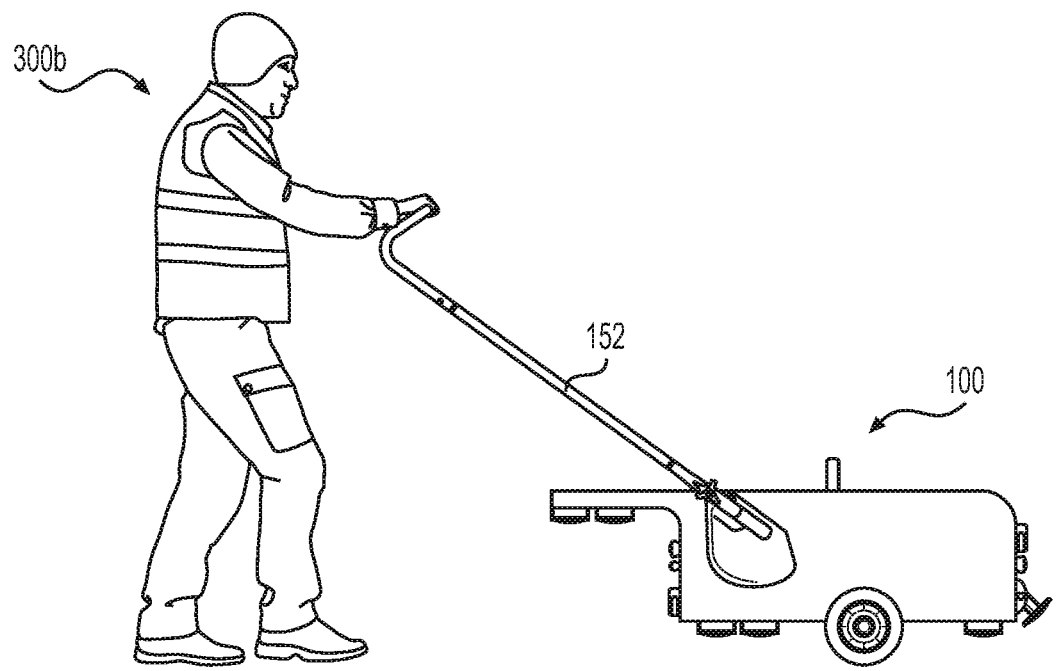
FIG. 3B presents an example of manual operation of the example vegetative health device as described herein.

FIG. 3B illustrates how the vegetative health device 100 may be pushed (or pulled) manually by an individual 300B. By being pushed (or pulled) by an individual 300B, it may be possible to have more control over which areas are mapped, as opposed to when dragged behind a large mower, since the individual 300B may direct the vegetative health device 100 to targeted areas for scanning Additionally, by being operated by an individual 300B, any electromagnetic interference may be further minimized. Though illustrated in FIGS. 3A and 3B as purely passive (i.e. dragged or pushed), it is also contemplated that such a vegetative health device may move autonomously (e.g. moving between a series of waypoints (including GPS locations) as calculated by the device, or other computerized system and/or received from a user) and/or under the control of a received signal (e.g. as a remote controlled device). In such examples, the vegetative health device 100 may comprise one or more of a battery (or other power source) and motor for powering the one or more wheels for locomotion.

Figure 4:
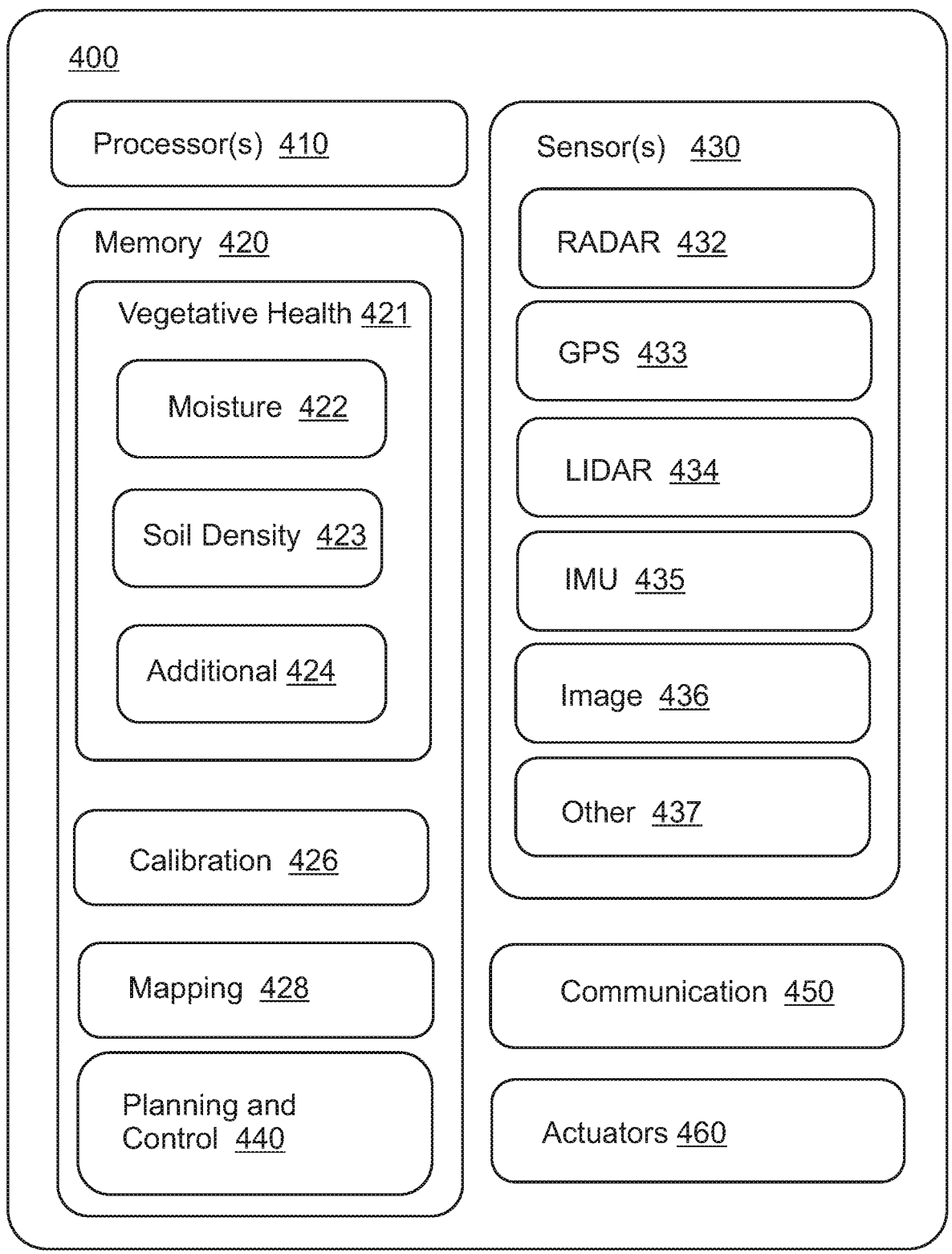
FIG. 4 depicts an example system capable of performing the functions of the vegetative health device of any of FIGS. 1-3.

FIG. 4 is an example system 400 capable of performing the operations described herein. Such a system 400 may comprise one or more of processors 410, memory 420, sensors 430, communication subsystem 450, and actuators 460. Further, though depicted in FIG. 4 as a single system 400 for illustrative purposes, the intention is not to be so limiting. For example, the system 400 may be a distributed system (either locally or non-locally), where each block may be present on (or performed by) a remote system.

The system 400 may include one or more processors 410, any of which capable of performing the operations described herein. In some examples, the processor(s) 410 may be located remotely from the vegetative health device. In such examples, sensor data collected may be stored in memory 420 and transferred, e.g. over a wired or wireless connection via communication subsystem 450, to a server (such as a cloud based server), with processor(s) 410 and memory 420 similar to that of system 400 capable of performing the operations described herein. For example, the one or more processor(s) 410 may comprise one or more central processing units (CPUs), one or more graphics processing units (GPUs), digital signal processors (DSPs), field programmable gate arrays (FPGAs), application specific integrated circuits (ASICs), or the like.

Memory 420 is an example of non-transitory computer readable media capable of storing instructions which, when executed by any of the one or more processor(s) 410, cause the system 400 to perform any one or more of the operations described herein. The memory 420 can store an operating system and one or more software applications, instructions, programs, and/or data to implement the methods described herein and the functions attributed to the various systems. In various implementations, the memory 420 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 420 is capable of storing raw sensor data from the one or more sensor(s) 430, compressed or downsampled sensor data, output of one or more machine learning models (e.g., feature maps of neural networks), and/or representations of the raw sensor data.

The sensor(s) 430 may comprise one or more radars 432 (such as any of the radar devices 110, as shown in FIG. 1). Radars 432 may be configured to be in either a near-field (e.g. close to the ground) or far-field (e.g. disposed about the vegetative health device at least an order of the wavelength from a surface). In some examples, near-field radar may operate at 900 MHz, while far-field radar operate at 2.4 GHz. One or more of the radars 432 may have their respective transmitters and receivers separated from one another by a fixed distance, ranging from being adjacent to one another to on the order of several feet. One or more of the radar receivers (or radar antennae), such as patch antenna, dipole antenna, yagi antenna, horn antenna, and the like, may be configured for differing polarizations (parallel, perpendicular, or circular in either direction). One or more of the radars 432 may be angled with respect to the surface (e.g. between 0 and 90 degrees, including about or around 45 degrees). Each of the one or more transmitters may operate in a different frequency. Such spacing and frequency differences may aid in reducing noise and increasing sensitivity to moisture content. Any such sensors may operate as FWCM, CW, TDR and the like.

Additionally, or alternatively, the sensor(s) 430 may comprise one or more Global Positioning Systems (GPS) 433, one or more lidars 434, inertial measurement unit(s) 435 (which may comprise one or more accelerometers, gyroscopes, magnetometers, or the like), and one or more image sensors 436. Image sensors 436 may comprise, for example, RGB cameras, intensity cameras (e.g. greyscale), stereo cameras, depth cameras (e.g. structured light sensors, time of flight (TOF) cameras, etc.), RGB-D cameras, infrared cameras, and the like. In those examples where multiple image sensors 436 are contemplated, various image sensors 436 may have varying fields of view. For example, where at least two image sensors 436 are used, one image sensor 436 may be a narrow field of view camera and the other a wide angle field of view camera.

Other sensor(s) 437 may include, for example, encoders (such as wheel encoders), ultrasonic transducers (e.g. SONAR), thermal imaging sensors (e.g. infrared imagers), non-contact temperature sensors (e.g. sensors capable of determining the temperature of a surface), ambient light sensors (e.g. light sensors such as, but not limited to, photodiodes capable of determining an intensity of light at 600-1200 nm), humidity sensors, pressure sensors, bolometers, pyrometers, wind speed sensors, and the like. Sensor data from such other sensors 437 may provide additional insight into the health of vegetation in the vicinity of the vegetative health device, as well as be used to generate the three-dimensional maps and/or localize the device 400. For example, when plants are wilting, or about to wilt, temperature rises. As such, higher temperatures associated with the certain regions may be associated with wilting. One or more ambient light sensors may be used in conjunction with temperature sensors to estimate an amount and/or quality of sunlight (and/or other light sources) the plants receive. As described in detail above, sensor data from any one or more of sensor(s) 430 may be used to determine regions of poor growth, regions of no growth, presence of pests, presence of weeds, and the like. Additionally, or alternatively, one or more other sensor(s) 437 may provide additional information about the movement of the vegetative health device 400 (including velocity) such as, but not limited to, wheel encoders, IMUs (any one or more of accelerometers, gyroscopes, magnetometers, etc.), GPS receivers, etc. In some examples, sensor data from one or more ultrasonic transducers may be used to both aid in detection of a ground level through the vegetation, as well as to detect features of objects to be used for mapping (i.e. to "see" through a canopy). Such ultrasonic sensors (e.g. SONAR) may be positioned and oriented in the same manner as the radar 432 so as to allow for comparisons or combinations of sensor data between the two. Determining the distance to the ground through vegetation by use of both ultrasonic transducers, as well as radar 432, may provide information of vegetation height, which can be used, for example, as another indication of vegetative health, mapping and localization, and/or for input into moisture content determinations. As above, sensor data from the one or more other sensor(s) 437 may be associated with the map and/or used as additional data sources in the mapping processes.

Any of the one or more sensor(s) 430 may also be associated with a timestamp including, but not limited to, a time of day, time of month, and/or time of year (e.g. Jan. 16, 2018 4:50 am UTC). As such, comparisons of vegetative health (e.g., moisture levels, growth, color, temperature, presence of pests, etc.) between multiple scans may be more accurate by updating or weighting the sensor data based at least in part on the time of day, month, and/or year. For example, moisture content may be higher immediately after a watering during the early morning hours than at midday. Similarly, moisture content may be higher in the winter months than in the summer, where temperatures remain cooler. In some examples, a new vegetative health map is created with respect to user-defined periods of time (e.g. a new map is created during each new day of scanning) In some examples, a user may specify whether to update an existing map and/or generate a new map. In at least some examples, two or more maps (including a currently generated map) may be compared to each other to determine one or more indicators of vegetative health. As a non-limiting example, if an indicator associated with a region in one map differs more than or equal to a threshold amount in a previous map, change of vegetative health may be determined (either a degradation or an improvement).

Such an example system 400 as shown in FIG. 4 may additionally or alternatively comprise one or more communication subsystems 450. An example communication subsystem 450 may be used to send and receive data either over a wired or wireless communication protocol, as well as provide data connectivity between any one or more of the processors 410, memory 420, and sensors 430. Such protocols may include, but are not limited to, WiFi (802.11), Bluetooth, Zigbee, Universal Serial Bus (USB), Ethernet, TCP/IP, serial communication, and the like. As indicated herein, such a communication subsystem 450 may be used to send sensor data from the sensor(s) 430 to other systems (e.g. cloud based computers, etc.), for generating the vegetative health maps. In at least some examples, to minimize an amount of data transferred (as raw sensor data may amount to upwards of multiple gigabytes to multiple terabytes per day), raw sensor data from the one or more sensors 430 may be downsampled or compressed before transmission. In at least one example, sensor data (whether raw, compressed, downsampled, a representation thereof, or otherwise) may be automatically uploaded to another computing device when in a particular location (e.g. when in a shed, or other preselected user location). Representations of data may include, for example, averages of the data, feature maps as output from one or more neural networks, extracted features of the data, bounding boxes, segmented data, and the like.

Vegetative Health Subsystem

Depicted in FIG. 4 is a vegetative health subsystem 421, which, in at least some examples, may reside in memory 420 in the form of non-transitory computer readable media. The vegetative health subsystem 421 may comprise any one or more additional subsystems, as will be described in detail below. In at least some examples, such subsystems may comprise, for example, a moisture subsystem 422, a soil density subsystem 423, and/or an additional subsystem 424.

Moisture Subsystem

Moisture subsystem 422 is configured to take sensor data from any one or more of the sensor(s) 430 and output an estimated moisture content level. As non-limiting examples, an increase in far-field reflected power is indicative of more moisture content. Near-field reflected power may be used to determine moisture content, as near-field coupled power between transmitter is reduced as a function of additional moisture. By using multiple receivers per transmitter of radar 432 (whether spaced adjacent to the transmitter or within multiple feet of the transmitter), moisture content in addition to surface and sub-surface features may be determined based on relative reflected power. Additionally, or alternatively, any one or more of the radar 432 may be configured to be in a continuous wave (CW), frequency modulated continuous wave (FMCW), or time domain reflectometry (TDR) mode. At least one of the radar 432 may be a phased array radar.

Moisture subsystem 422 may also be configured to vary one or more parameters of the one or more radar 432 to determine additional environmental features. As non-limiting examples, the moisture subsystem 422 may instruct the one or more radars 432 to change one or more of a power level, a frequency, a modulated wave-form (e.g. triangle, square, sinusoidal, etc.), etc. For example, since different vegetation may react differently to such different parameters, vegetative health for a variety of different vegetation can be determined by altering such parameters. Additionally, ground penetration of the radar signal is dependent on such parameters. By adjusting such parameters, moisture content about different vegetation, soil density as a function of penetration depth, moisture content as a function of penetration depth, and multiple subterranean features can be determined.

Additionally, or alternatively, the moisture mapping subsystem 422 may comprise one or more machine learning algorithms capable of segmenting sensor data, classifying sensor data, and/or otherwise providing additional information from the sensor data. As above, one such example machine learning algorithm is an artificial neural network, though any other machine learning algorithm is contemplated. Such an artificial neural network may take any sensor data of the one or more of the sensors as input and may output any one or more of a segmentation, a classification, vegetative health, a location of the sun, or any other estimate of an environmental parameter. Such machine learned algorithms (or models) may be trained, for examples, based on ground truth data. Such ground truth data may be obtained, for example, by acquiring sensor measurements of the one or more sensors and associating a vegetative health quality associated therewith (e.g., a moisture score from 0 to 1 with 0 being poor and 1 being good, and the like).

Soil Density Subsystem

As above, soil density may be an important factor in vegetative health, as some plants require a certain level of aeration. A soil density subsystem 424 may take in sensor data from any one or more of the sensors 430 to determine a soil density of the return. In some examples, the soil density subsystem 424 may be configured to optimize the one or more radars 432 for soil density operation. Such an optimization may comprise, for example, selecting a preferred frequency range of operation, selecting particular radar transmitter/receiver pairs for estimation, determining a preferred waveform for time domain reflectometry, or the like. As a non-limiting example, the soil density subsystem 424 may adjust the one or more parameters to vary a ground penetration level of one or more radar 432. A return radar signal for various depths may be associated with the soil density, providing an estimate of the density with respect to depth. In at least some examples, such a soil density may be determined in accordance with machine learning algorithms as described in detail herein.

Additional Vegetative Health Subsystem(s)

Also depicted in FIG. 4 as a further subsystem of the vegetative health subsystem 421 are additional vegetative health subsystem(s) 424. The additional vegetative health subsystem(s) 424 may receive data from any one or more of the sensor(s) 430 and determine additional indicators of vegetative health, as described in detail herein. In some examples, infrared data may be used to determine a red edge reflectance, which, in some examples, can be used to determine a normalized difference vegetation index (which may be one such indicator). As other non-limiting examples, sensor data may be input into one or more machine learned models to perform various operations, such as segmentations, classifications, detections, etc. In such examples, sensor data may be segmented based on, for example, color in image, radar intensity (power), radar cross-sectional area, and the like. Of course, multiple sensor data may be fused to increase likelihood of such determinations. As one example, a browner region in image data may correspond to lower moisture content as may be determined by the moisture subsystem 422. Such correspondence may provide a higher confidence of poor vegetative health for that particular region. Segmentations (or clusters, groups, etc.) may be compared to previously acquired data (and/or data from other (third-party) sources, such as satellite data, etc.) and/or detections (e.g., output from a detector network indicating the presence of pests) to determine whether such data corresponds to, for example, a change (such as a degradation) of vegetative health indicative of regions of poor growth, regions of no growth, regions having pests, regions having weeds or invasive species, and the like. Similarly, such change may represent an improvement (e.g., where a previous treatment has improved the vegetation). In some examples in which a previously generated map has with associated vegetative health indicators (poor growth, low moisture, no growth, pests, weeds, etc.) is determined and/or received (e.g., from third-party data, such as satellite data), the one or more indicators may be compared to such previously determined values (e.g., using a Euclidian distance (which may be weighted) therebetween, a Mahalanobis distance, or the like). Differences of more than or equal to threshold values may be used to determine a change (e.g., a degradation, improvement, or no change) of vegetative health for the region and/or provide an indication that treatment is needed for the particular issue. As a non-limiting example, one area which was previously green and is now brown in image data may be associated with over-fertilization, for example.

It is contemplated at any one or more machine learning models may be used to output such additional indicators of vegetative health based on any portion of the sensor data. Such output need not be binary (i.e., poor health or good health), but may indicate a range (e.g., 0 to 1) indicating a level of health associated with any one or more of health indicator (moisture level, expected growth, presence of pests, presence of weeds or invasive species, etc.).

Additionally, or in the alternative, such additional vegetative health subsystem(s) 424 can calculate an area associated with those detected regions having poor vegetative health. In one example, segmentations of image data may be associated with the corresponding map (either two- or three-dimensional) by, for example, projecting the image onto the map using known camera extrinsics and intrinsics, and the area can be calculated based at least in part on the map. Based on a known area, treatment options can be calculated. For example, most pesticides, insecticides, and the like require an application per unit area. Such calculations may subsequently be performed to determine a recommended treatment, comprising an area (which may be demarked by GPS locations). In at least some examples, the recommended treatment may be communicated, via the communications subsystems 450, to a user, additional computing system, and or to the planning and control subsystem 440.

Though depicted as multiple subsystems residing in the vegetative health subsystem 421, any subsystems described herein may comprise a separate subsystem, module, component, etc., whether in the system 400, or a remote system therefrom.

Calibration Subsystem

In order to accurately associate vegetative health (e.g., soil density, moisture level, temperature level data, etc.) with a map, sensor extrinsics and intrinsics for each sensor 430 need to be known. Such a calibration may be performed by a calibration subsystem 426, for example, using a calibration target having radar visible fiducials (e.g. corner reflectors) associated with visual fiducials (e.g. augmented reality tags, QR codes, logos or other markers, precomputed patterns, and the like). By simultaneously recording responses from the image sensors and radars, it is possible to perform an optimization (e.g. non-linear least squares, gradient descent, etc.) to determine the relative extrinsics between the various sensor modalities. In some examples, approximate relative positions and orientations may be known based on mechanical constraints of the system and/or used as an initial assumption during optimization. Such an optimization may also provide estimations for sensor intrinsics. Calibration subsystem 426 may take in sensor data from any one or more of the sensors 430 and perform a calibration as above to output one or more sensor intrinsics and/or extrinsics.

Mapping Subsystem

A mapping subsystem 428 may take in sensor data from any one or more of the sensor(s) 430, in addition to any one or more outputs from the moisture estimation subsystem 422, the soil density subsystem 423, the additional vegetative health subsystem(s) 424, and/or the calibration subsystem 426. In at least one example, sensor data from the one or more sensor(s) 430 may be used to construct a two- and/or three-dimensional map of the scanned area. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map may be stored as a signed distance function (SDF), or truncated SDF (TSDF), triangle mesh, mosaics, etc. Use of voxel hashing may improve memory requirements for both storage and raycasting. In at least some examples, sensor data may include radar data indicative of subterranean objects (e.g. pipes, golf balls, rocks, etc.). Such subterranean objects may provide features for use in creating the map. For example, locations of sprinklers, piping, rocks, moisture levels, and the like may be combined (or fused) with other sensor data to both generate the maps and localize against them.

Furthermore, various combinations of sensor data may be used to provide additional insight as derived sensor data. As a non-limiting example, sensor data from wide-angle, dual baseline, image sensors 436 may be used to reconstruct depth of the environment and provide additional features for use in generating the map and or localizing the vegetative health device. Additionally, or alternatively, sensor data from the one or more sensors 430 may be input into one or more machine learning algorithms (e.g. artificial neural networks) configured to output an estimation of an aspect of the environment (e.g. an indicator of vegetative health, a segmentation, a classification, solar direction, and the like). Any such derived sensor data may be either used for mapping and/or localization, as well as may be associated with the map after it has been generated (e.g. storing the value associated with the portion of the map where the data was collected). In some examples, GPS data from the GPS sensors 433 may be used to inform a Region of Interest (ROI) of satellite imagery to download to, or otherwise augment, the two- or three-dimensional map. Additionally, or alternatively, such a system 400 may download, or otherwise access, weather data as additional sensor data. The weather data may be indicative of, for example, weather conditions for the time of day associated with the other sensor data.

Such maps may comprise signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (growth, absence of growth, presence of pests, presence of weeds or invasive species, etc.), thermal data, ambient light data, etc. may be associated with every location in the three-dimensional map. Additionally, or alternatively, image sensor data (e.g. color) may be associated with the map as well (e.g. by weighted averaging, or the like), so that a user viewing the map would quickly see a virtual representation of the scanned area, including color.

Planning and Control Subsystem 440

The planning and control subsystem 440 may determine commands for operating one or more of the actuator(s) 460. In some examples, such a planning and control subsystem 440 may determine one or more trajectories for the system 400 to follow (e.g., by determining a series of steering commands, acceleration commands, etc. which cause the system 400 to follow an intended path). Such trajectories may be determined in accordance with waypoints (e.g., GPS-based waypoints) as may be received from a user via communications subsystem(s) 450 and/or calculated to optimize (e.g., minimize) a length of travel over a defined region of interest (e.g., as may be provided by a user). Such calculations may be determined, for example, using Bellman Ford's algorithm, Dijkstra's Algorithm, or otherwise.

In at least some examples, such a planning and control subsystem 440 may additionally, or alternatively, receive the recommended treatment from additional vegetative health subsystem(s) 424. In such examples, the planning and control subsystems 440 may determine additional signals to disperse any one or more of seed, fertilizer, insecticide, herbicide, pesticide, etc. at determined rates and at areas associated with the recommended treatment. Such additional signals may comprise signals to open and/or close one or more bays of the system 400 holding fertilizer, herbicide, pesticide, insecticide, seed, and the like so as to uniformly apply the selected treatment over the area associated with the treatment. Of course, in some examples, application need not be uniform and other distributions are contemplated.

In those examples in which the system 400 is operated manually (e.g., by being pulled, pushed, attached to a mower, etc.), the planning and control subsystem 440 may still calculate an optimal control path for a user to take. As a non-limiting example, such a trajectory may comprise the shortest path needed to sweep an area (region) provided.

In any such example provided herein, such trajectories and/or controls may be calculated iteratively (and/or periodically) such that the system 400 (and/or associated user(s)) always has the most relevant information.

Actuators

In at least some examples, the system 400 may have one or more actuator(s) 460. Such actuators may comprise, for example, electric and/or mechanical motors, hydraulics, pneumatics, and the like. Upon receiving a signal from one or more of the planning and control subsystem 440 and/or the additional vegetative health subsystem(s) 424, at least a portion of the actuator(s) may actuate in order to effectuate a trajectory (steering, acceleration, etc.), release fertilizer, seed, herbicide, pesticide, insecticide, seed, etc., and the like.

Figure 5:
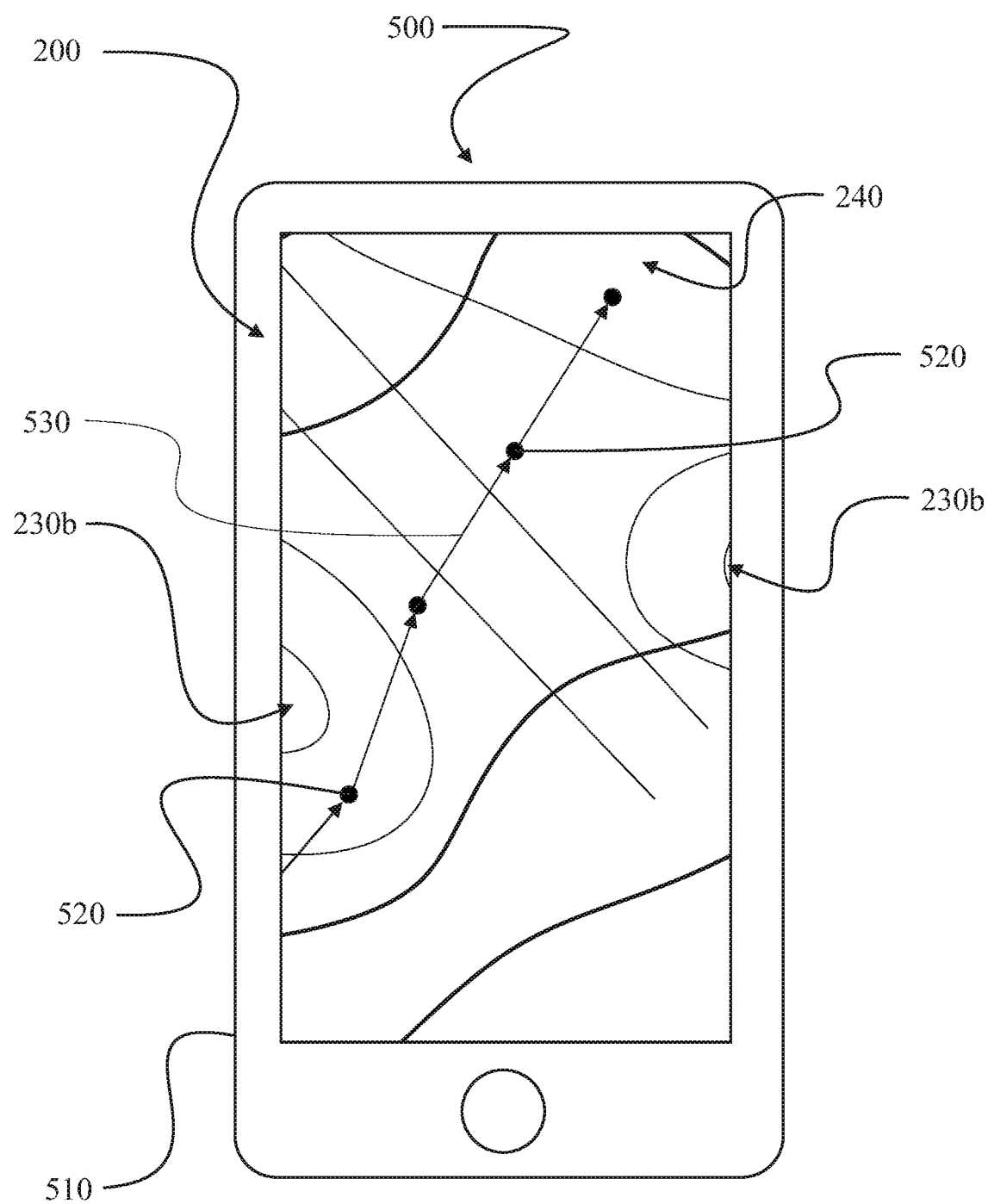
FIG. 5 shows an example mobile application in which a user may interact with the vegetative health maps created by a vegetative health device, such as one illustrated in any of FIGS. 1-3.

FIG. 5 depicts an example user interface 500, displaying an example three-dimensional vegetative health map 200 as may be accessible by a user. In the example shown, the three-dimensional vegetative health map 200 may be accessible via a computing device such as a smart phone 510, though any other computing device is contemplated. The three-dimensional vegetative health map 200 may be downloaded from a cloud based server, directly from the vegetative health device (e.g. over a wired or wireless connection), or any other computing device which is able to generate the three-dimensional map from the sensor data, as described herein. The map may be accessible via a mobile application, via a web browser connected to the internet, and the like.

As shown in FIG. 5, the user may be shown a portion of (or all of) the three-dimensional vegetative health map 200 created by the one or more vegetative health devices (e.g. multiple mapping devices operating in a fleet and/or multiple scans of an area at different times and/or similar times, including the same time). As illustrated, the map 200 is indicative of a portion of a single hole of a golf course. The user may zoom in or out of particular areas of the map to better determine vegetative health.

Here, one or more of moisture content, temperature, ambient light, and/or additional indicators of vegetative health may be displayed to the user by various shading (e.g. darker portions may indicate higher moisture), color (e.g. different coloring for different moisture levels), and/or differing contour levels (e.g. higher density of lines equated with higher moisture levels). In at least some examples, differing indicators of vegetative health may be represented differently in a same display simultaneously (e.g., moisture level by contour lines, detection of pests by shades of a first color, and/or lack of growth by a second color). In at least some examples, additional information, such as recommended treatments (e.g., as provided by the additional vegetative health subsystem(s) 424), may be displayed to the user and/or associated with one or more regions on the displayed map. By providing such a representation to the user, the user is able to quickly glean vegetative health and assess and potential problems. By way of example, the user may be able to quickly tell that a sprinkler has burst where there is higher moisture content (such as in areas 230a or 230b), or that a sprinkler is malfunctioning where there is lower moisture content than required (such as in area 240).

In some examples, the user may select one or more previously generated maps based on, for example, time of day and/or time of year for comparison. By allowing the user to compare previously generated maps having similar times of day and/or times of the year (e.g. comparing a map generated one morning with a map generated the day before), the user may be able to quickly glean any improvements to, or degradations of, vegetative health. For example, the user may be able to determine that a replaced sprinkler is now functioning properly and providing the optimal moisture content to a previously dry area.

In at least some examples, the user may place waypoints 520, or otherwise designate a path 530. Such a path 530 is indicative of a preferred travel route for the vegetative health device. For example, as shown in FIG. 5, the user may want to confirm moisture levels determined during a previous mapping and request the device to move to the area having low moisture content. The path 530 may be communicated to an operator of a mower or the individual pushing the device, so that the device is brought along the preferred route or path in the environment. In some examples, where the device is capable of moving under its own power (e.g. the device is equipped with motorized wheels for locomotion), the device may autonomously traverse the path 530 indicated by the user (or generated based on the waypoints 520, such as by Bezier curves, clothoids, etc.). Additionally, or alternatively, the user may use such waypoints 520 as boundary points for a region of interest (defining a geofenced region). In such examples, the device (e.g., system 400) may calculate trajectories for filling in such a region (e.g., optimally computing a path(s) or trajectories to sweep such a defined region using minimal energy, minimal motion, and the like).

Though not illustrated, the user may also choose to view the path the vegetative health device followed in order to generate the map. For example, the user may want to see the path that was taken in the most recent scanning Here, the user may opt to have the device velocities, directions, etc. overlaid onto the map.

Figure 6:
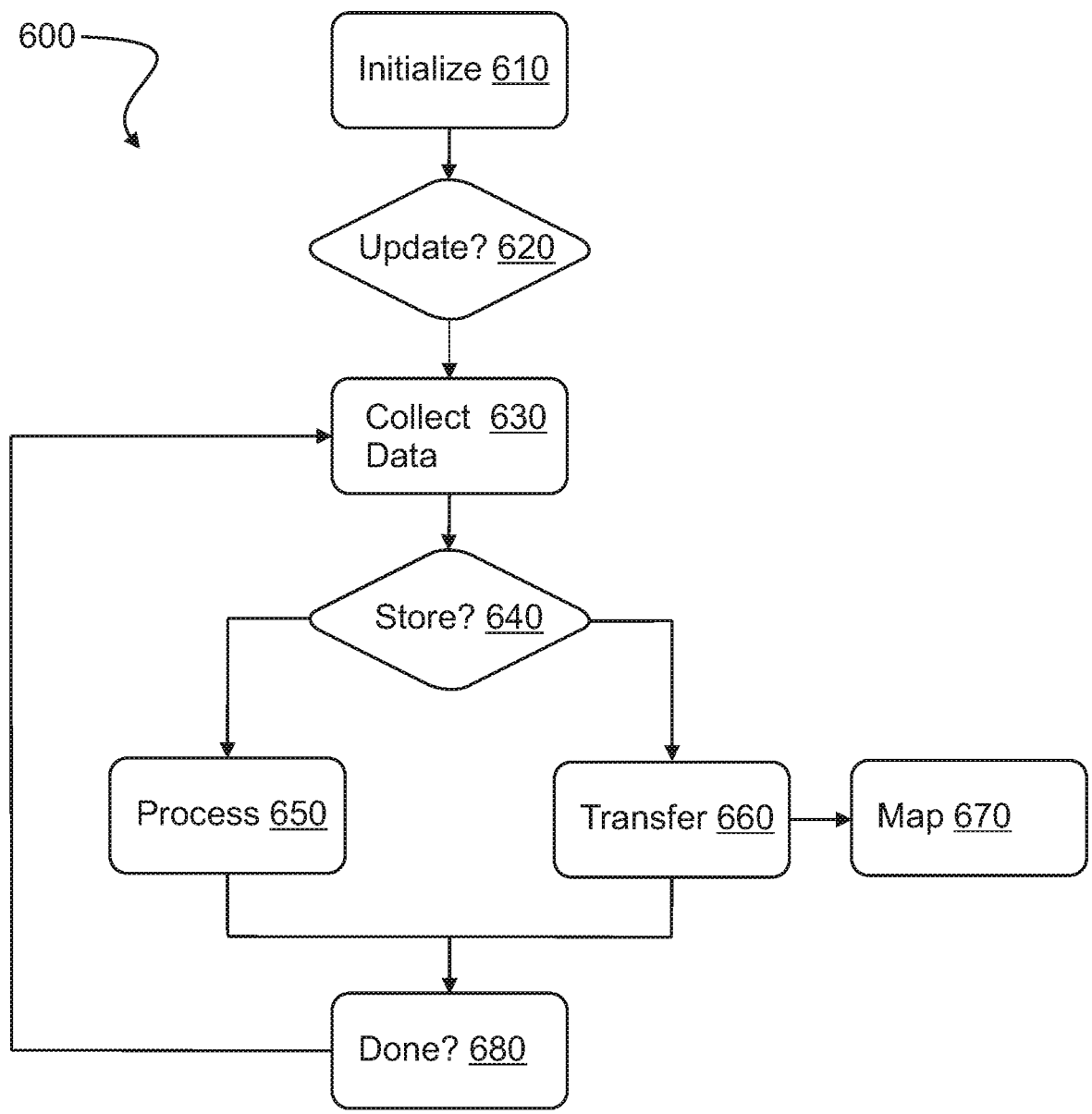
FIG. 6 presents a flow chart depicting how such an example of how vegetative health device may build a map of vegetative health, including moisture levels.
Figure 7:
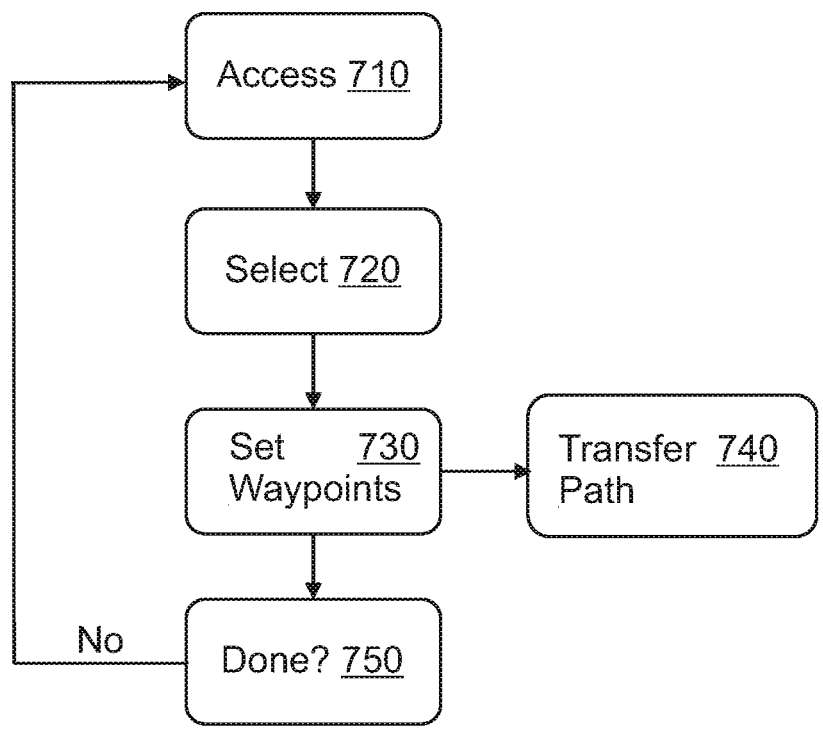
FIG. 7 illustrates an example flow chart of how a user may utilize a vegetative health map to monitor and improve vegetative health.
Figure 8:
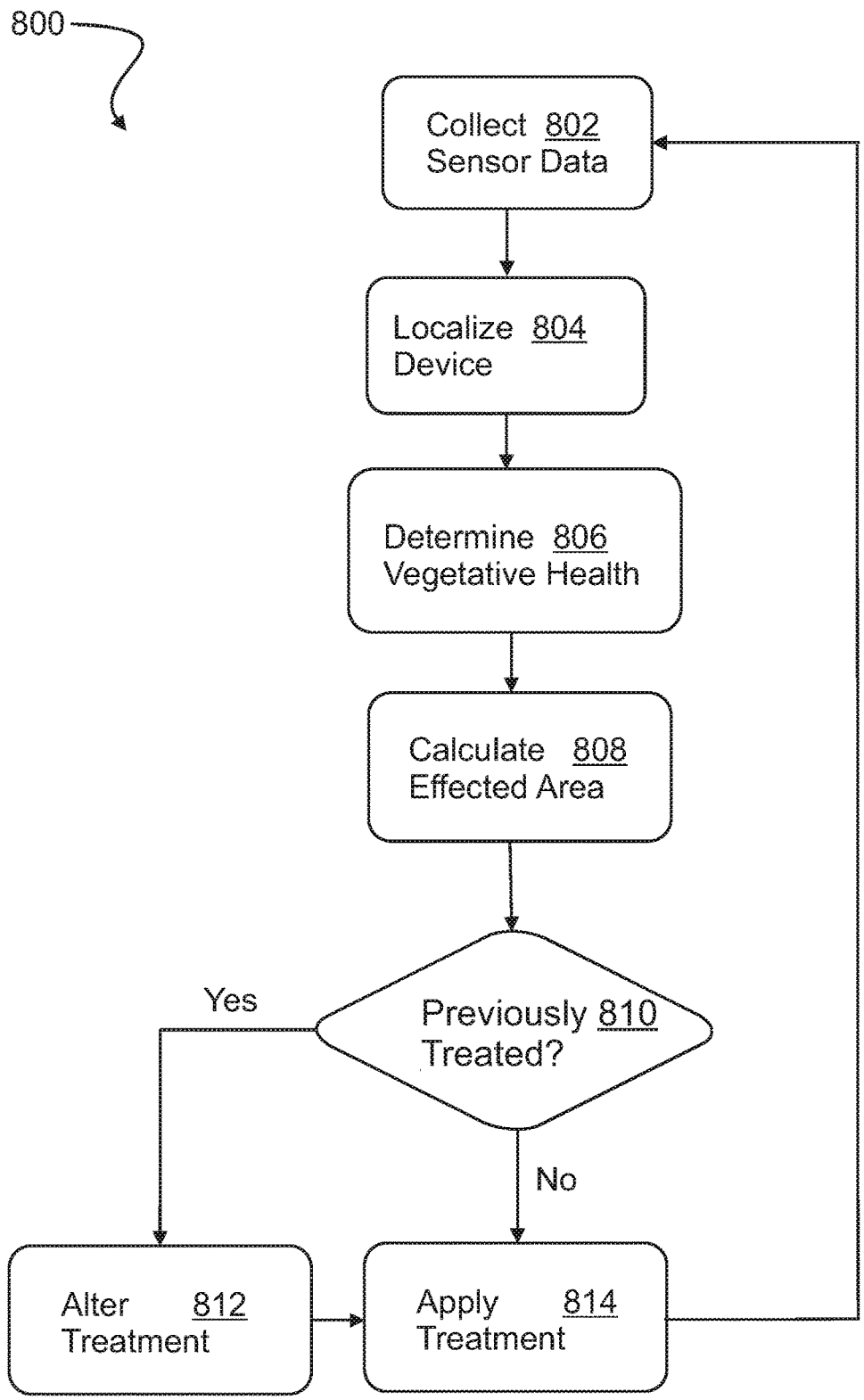
FIG. 8 depicts a flow chart of an example technique for determining a change of vegetative health and determining a recommended treatment.

FIGS. 6, 7, and 8 illustrate flow diagrams of various processes as described herein. Each block of the flow diagram may represent a module of code to execute one or more processes described herein. Though illustrated in a particular order, the following figures are not meant to be so limiting. Any number of blocks may proceed in any order and/or substantially simultaneously (i.e. within technical tolerances of processors, etc.) to perform the operations described herein.

FIG. 6 illustrates an example 600 for creating a three-dimensional vegetative health map in accordance with any of the descriptions herein. At 610, a vegetative health device may be initiated for scanning Initiation may refer to a state of the vegetative health device in which the vegetative health device is collecting data from sensors and/or generating (or updating) a vegetative health map. As above, such a vegetative health device may be towed (or pushed) by a vehicle (such as, for example, a tractor, mower, etc.), towed (or pushed) by an individual, and/or propelled under its own power (autonomously or by remote signal). In some examples initiation may be associated with a geofenced region. For example, based on a user defined locus of GPS points (e.g. a geofence), the vegetative health device may be initiated if a current GPS location of the vegetative health device is within the geofence. For example, the vegetative health device may turn on when taken out of a garage or when approaching a hole of a golf course. Additionally, or alternatively, initiation may be manual. As non-limiting examples, a button or switch on the vegetative health device or a signal receivable by the device (e.g. over a wireless connection) may cause initiation.

At 620, a decision may be made as to whether to generate a new map or update an existing map. Updating the map may be based on the existence of a previously generated map (i.e. if there is no known map, create a new one), a time of day, a time of year, a current weather phenomenon (rain, wind, snow, etc.) or otherwise indicated by a user. As a non-limiting example, if a previously generated map was generated the same day (or within a day) of a current mapping, mapping may comprise updating the first map, as opposed to creating a new map. In those examples in which the map is updated, such updating may comprise weighted averages based at least in part on, for example, a time of day, weather, etc.

At 630, the vegetative health device may collect sensor data from any of the one or more sensors. At 640, a decision is made whether to process sensor data at the vegetative health device is made. If so, at 650 at least a portion of the sensor data may be used for estimating moisture content, soil density, surface temperature, ambient light intensity, segmentations, classifications, feature maps, additional indicators of vegetative health, etc. and associated with a map such that each point of the map provides insight into moisture levels, soil density, additional indicators of vegetative health, etc. Such maps may be generated using any portion of sensor data, as described in any example herein (e.g., using SLAM, Kalman filters, or the like, as described herein).

Otherwise, at 660, sensor data is transferred (either stored in memory on the vegetative health device or to another device), including any transformations of the data (i.e. compressed, downsampled, represented by, etc.). Here, the sensor data may be transferred to local memory for storage, uploaded to a remote system, or otherwise wired or wirelessly transferred to another system for processing. At 670, such transferred sensor data is retrieved by a second system for generating the vegetative health maps (the same or similarly as in 650), determining heuristics, metrics, actionable items, and the like.

At 680, if the moisture mapping is still within a geofence (or not shut off manually by the user), the process proceeds to 630. Otherwise, the vegetative health device stops receiving sensor data and may transmit any generated three-dimensional vegetative health maps and/or sensor data (whether raw, compressed, downsampled, representative, etc.) to another computerized system for storage and/or processing, whether over a wired or wireless communication link. In some examples, the system may stop collecting data after a predetermined period of time (e.g. on the order of seconds to hours). In other examples, the process 600 may continue until manually stopped (either via a physical switch or button on the device, or by a signal received by the device over a wired or wireless communication as initiated by a user).

FIG. 7 illustrates an example 700 of how a user may interact with one or more of the three-dimensional maps. At 710, the user may access a vegetative health map. Accessing the map may comprise downloading (wirelessly, or over a wired connection) at least a portion of map data, sensor data (whether raw, compressed, down sampled, and/or representations thereof) to a mobile application on a smartphone, a web browser and/or a software application on a computing system, and the like. In those examples where sensor data (whether raw, compressed, or otherwise) is relayed, one or more computing systems at the user's location may perform the methods and processes described herein to create the vegetative health maps. By accessing the map, the user is displayed at least a portion of the map and/or data about the area (moisture content, soil density, additional indicators of vegetative health, etc.).

At 720, the user may select a different area of the map and/or one or more physical parameters to display (e.g. actionable items, moisture content, additional indicators of vegetative health, ambient light, surface color, surface temperature, weather conditions associated with the scan, etc.). Based at least in part on the user selections, the three-dimensional map may be overlaid with any one or more representations of the selected data. Any such representations may be by color, shading, and/or contour lines and/or any one or more of such representations may differ and/or be displayed simultaneously to the user. Based at least in part on the user selected area and scale, that portion and scale of the three-dimensional map may be displayed to the user. In some examples, the user may be displayed actionable items (e.g. water is needed in a certain area, plants need trimming, an area is dry, presence of pests, plants in need of fertilization, locations in need of seeding, etc.) based on any one or more of the data available.

At 730, the user may select one or more waypoints and/or a path (e.g. by clicking, drawing a line with a finger or mouse, etc.). For example, the user may desire an area to be remapped and/or otherwise investigated. In at least some examples, the one or more waypoints may define a geofenced region in which a device may plan and navigate autonomously as described in detail herein. At 740, the one or more waypoints and/or path may be communicated (over a wired connection or wirelessly) as a signal to the vegetative health device. In those examples where the vegetative health device is passive (e.g. is pulled by a mower or pushed by an individual), the signal may indicate to an operator of the mower or the individual to move to the points, or along the path. In those examples where the vegetative health device is capable of moving under its own power, the vegetative health device may use various path planning algorithms (e.g. A*, D*, Dijkstra's algorithm, etc.) to follow the path and/or waypoint(s) and/or otherwise optimize (minimize) a path to sweep over an indicated geofence region.

At 750, the user may decide to stop viewing the three-dimensional map. If the user desires to continue viewing the map, the process may proceed back to 710.

FIG. 8 depicts an example flow diagram of how a device (such as system 400) may detect poor vegetative health and provide recommendations and/or perform actions in order to remedy such poor vegetative health.

At 802, one or more sensors on a vegetative health device, such as system 400, may collect sensor data. Such sensors may comprise, for examples, cameras (RGB, intensity, depth, RGB-D, infrared, ultraviolet, etc.), radar, lidar, ultrasonics, GPS, IMU, wheel encoders, etc., as provided for herein and otherwise.

At 804 at least a portion of the sensor data may be used to localize the device and/or create a map associated therewith. As described herein such localization and/or mapping may be done according to any techniques provided for herein, such as using SLAM in mapping subsystem 428.

At 806, various indicators of vegetative health may be determined. As non-limiting examples described herein, such indicators may comprise, for example, moisture levels associated with a region, soil density associated with a region, presence of pests (insects, varmints, etc.) in a region, presence of weeds or invasive species in a region, lack of growth in a region, poor growth in a region, and the like. In any such example, indicators may be determined by inputting at least a portion of the data into one or more machine learning algorithms (or models) determined to output such indicators. In at least some examples, the output may be based on combinations of various sensor data and have a certainty associated therewith. In some examples, such indicators may comprise a range of values and/or a binary status. The one or more indicators may then be associated with the map such that every portion of the map is associated with the indicators determined. In at least some examples, such association may be determined in accordance with one or more interpolations (linear, bilinear, cubic, bicubic, etc.).

At 808, an effected area of poor vegetative health may be calculated. In some examples, previously recorded map data (and/or map data available from third party sources, such as satellite data) may be compared to currently determined indicators. One or more regions having one or more indicators which differ more than a threshold amount (e.g., as may be provided by a Euclidian difference, Mahalanobis difference, or the like) may be flagged as needing remedial action. In at least some examples, the various indicators of vegetative health may be clustered by a clustering algorithm (e.g., using k-means, etc.), or otherwise grouped or combined to define the one or more regions. Such regions may then be provided to a user such that the user may provide a determination whether or not one or more treatments need to be applied to the region. In additional, or alternate, examples, such determination may be made by one or more machine learning algorithms.

In any such example provided herein, the region may then be associated with the map. As a non-limiting example, a segmentation of an image may be projected onto a map to determine an area in an environment associated therewith. The area and the indicator(s) may, in turn, be used to calculate a proposed treatment. As non-limiting examples, the area may be used to determine an amount of seed associated with an indicator of lack of growth, a determined amount of fertilizer associated with an indicator of poor growth, a determined amount of herbicide, pesticide, and/or insecticide associated with an indicator of pests, and the like. Such regions (areas) and treatments may comprise a recommended treatment.

At 810, a determination may be made as to whether the recommended treatment was previously applied to the region. If the same recommended treatment was previously provided, an alternate recommended treatment may be determined at 812 (e.g., one or more of increasing and/or decreasing the amount). In at least some examples, a time period associated with such difference may be determined in accordance with the particular treatment. As a non-limiting example, if a subsequent mapping determines that, after a week, treatment of an herbicide was ineffective, an increased amount may be recommended. In another example, no growth after applying seed two days prior may cause no additional seed to be dispensed as an expected growth time is on the order of weeks or months.

If no recommended treatment was previously applied at 810 and/or after an alternate treatment recommendation is determined at 812, the recommended treatment (which may be the alternate recommended treatment of 812) is communicated. In some examples, such communication may be to a user for administration of the recommendation. In at least some examples, the communication may be to a planning and control subsystem, such that the planning and control subsystem may control one or more actuators to open and close one or more bays in accordance with the recommended treatment so as to provide the recommended amount over the detected region or area, whether homogeneously, or having some other distribution. As a non-limiting example, such actuation may comprise opening a seed bay to uniformly distribute grass seed in a region having no grass where grass was expected. The process may then return to 802 to collect more data.

Conclusion

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g. A, AB, AB, ABC, ABB, etc.). When "and/or" is used, it should be understood that the elements may be joined in the alternative or conjunctive.

What is claimed is:

1. A vegetative health device comprising:
one or more processors, the one or more processors comprising instructions stored in non-transitory computer readable media, which, when executed by the one or more processors, cause the one or more processors to perform operations comprising:
receiving, at the vegetative health device, a plurality of coordinates, wherein the plurality of coordinates define a bounded region of interest;
determining, based at least in part on the plurality of coordinates, a trajectory to sweep the bounded region of interest using at least one of minimal energy or minimal motion;
receiving sensor data from one or more sensors on the vegetative health device, the one or more sensors comprising one or more radars;
determining, based at least in part on a first portion of the sensor data, a three-dimensional map;
determining, based at least in part on a second portion of the sensor data, a moisture content level;
determining, based at least in part on one or more of the first or second portion of the sensor data, a location of the vegetative health device with respect to the three-dimensional map;
associating the moisture content level with the three-dimensional map; and
controlling the vegetative health device to move along the trajectory.

2. The vegetative health device of claim 1, wherein the vegetative health device further comprises a coupling configured to one or more of:
couple the vegetative health device to a ground vehicle, or
couple the vegetative health device to a handle to be pushed by an operator.

3. The vegetative health device of claim 1, wherein the one or more sensors further comprise a camera configured to output one or more images or a lidar configured to output one or more lidar returns, the sensor data comprising at least the one or more images or the one or more lidar returns, and
wherein the operations further comprise:
providing a third portion of sensor data to a machine learning model;
receiving, from the machine learning model, an indication of vegetative health associated with the location;
associating the indication of vegetative health with the three-dimensional map;
determining a degradation of vegetative health;
determining an area associated with the degradation;
determining, based at least in part on the area, an amount of one or more of herbicide, pesticide, fertilizer, or seed; and
applying the amount to the area.

4. The vegetative health device of claim 3, wherein determining a degradation of vegetative health comprises:
receiving a previous indication of vegetative health associated with the location from one or more of a previously generated three-dimensional map or from third party data;
determining a difference between the previous indication and the indication; and
determining the difference meets or exceeds a threshold.

5. The vegetative health device of claim 1, wherein the one or more radars comprise a near-field radar or a far-field radar,
wherein the moisture content level is determined based at least in part on the near-field radar; and
wherein the operations further comprise one or more of:
altering an intensity of at least one of the one or more radars; or
altering a frequency of at least one of the one or more radars.

6. The vegetative health device of claim 1,
wherein the three-dimensional map is displayed to a user on a user device,
wherein one or more of the moisture content level or additional vegetative health indicators are displayed to the user on the user device over the three-dimensional map; and
wherein the plurality of coordinates are input by the user and received from the user device, the plurality of coordinates indicating one or more of waypoints for the trajectory or boundary points of a geofence.

7. A method for generating three-dimensional vegetative health maps comprising:
receiving a plurality of coordinates, wherein the plurality of coordinates define a bounded region of interest;
determining, based at least in part on the plurality of coordinates, a trajectory to sweep the bounded region of interest using at least one of minimal energy or minimal motion;
receiving sensor data from one or more sensors on a device as the device moves through an environment, the one or more sensors comprising one or more radars;
determining, based at least in part on a first portion of the sensor data, a three-dimensional map;
determining, based at least in part on a second portion of the sensor data, one or more indicators of vegetative health associated with vegetation at the location, the one or more indicators of vegetative health comprising a moisture content level of the vegetation;
determining a change of vegetative health;
determining, based at least in part on the three-dimensional map and one or more of the first or second portion of the sensor data, a location of the device;
associating the one or more indicators of vegetative health with the three-dimensional map; and
controlling the device to move along the trajectory.

8. The method of claim 7, wherein determining the change comprises: receiving a previous indication of vegetative health associated with the location; determining a difference between the previous indication and the indication; and determining the difference meets or exceeds a threshold.

9. The method of claim 8, the method further comprising:
determining an area associated the change;
determining, based at least in part on the area and the indication of vegetative health, an amount of one or more of seeds, fertilizer, herbicide, pesticide, or insecticide; and
controlling the device to dispense the amount over the area.

10. The method of claim 9, wherein the change is associated with one or more of:
a low moisture level,
presence of pests,
presence of weeds or invasive species,
poor growth, or
lack of growth.

11. The method of claim 7, wherein determining the three-dimensional map comprises one or more of evaluating a SLAM algorithm, a Kalman filter, or a Bayesian filter.

12. The method of claim 7,
wherein the three-dimensional map is displayed to a user at a user device,
wherein at least one representation of the one or more indications of vegetative health are displayed to the user, and
wherein the coordinates are received from the user via the user device.

13. The method of claim 7, wherein the one or more sensors comprise one or more of a near-field radar, a far-field radar, a camera, or a lidar.

14. The method of claim 13, wherein the one more sensors comprise a near-field radar,
wherein determining the moisture content level comprises determining a differential measurement associated with the near-field radar, and
wherein the method further comprises altering one or more of an intensity of the near-field radar, a frequency of the near-field radar, or a wave form associated with the near-field radar.

15. One or more non-readable computer readable media having instructions stored thereon which, when executed by one or more processors, cause the one or more processors to perform the operations comprising:
receiving sensor data from one or more sensors on a device, the sensor data associated with an environment through which the device is travelling, and the one or more sensors comprising one or more radars;
determining, based at least in part on a first portion of the sensor data, a map;
determining, based at least in part on a second portion of the sensor data, a moisture content level associated with vegetation in the environment;
determining, based at least in part on a third portion of sensor data, an indication of vegetative health of the vegetation;
determining, based at least in part on the map and one or more of the first or second portion of the sensor data, a location associated with the device;
associating the moisture content level with the map;
associating the indication of vegetative health with the map;
transmitting, to a user device, one or more of the map, the moisture content level, or the indication of vegetative health;
receiving, at the device, a plurality of coordinates, wherein the plurality of coordinates define a bounded region of interest;
determining, based at least in part on the plurality of coordinates, a trajectory to sweep the bounded region of interest using at least one of minimal energy or minimal motion; and
controlling the device to follow the trajectory, wherein the trajectory is determined to minimize a path required to sweep a geolocation region associated with the plurality of coordinates.

16. The one or more non-transitory computer readable media of claim 15, the operations further comprising:
receiving a previous indication of vegetative health of the vegetation;
determining a difference between the indication of vegetative health and the previous indication of vegetative health;
determining the difference meets or exceeds a threshold;
determining a change in vegetative health of the vegetation based at least in part on the difference meeting or exceeding the threshold;
determining an area associated with the change;
determining an amount of one or more of seed, fertilizer, herbicide, or pesticide to apply; and
causing the device to dispense the amount over the area.

17. The one or more non-transitory computer readable media of claim 16, wherein determining the indication of vegetative health comprises:
inputting, into a machine learned algorithm, the third portion of sensor data; and
receiving, from the machine learned algorithm, the indication of vegetative heath, and
wherein the indication comprises one or more of:
a segmentation of the third portion of sensor data,
a classification of the third portion of sensor data, or
a detection associated with the third portion of sensor data.

18. The one or more non-transitory computer readable media of claim 15,
wherein the one or more sensors comprise a near-field radar and a far-field radar, and
wherein determining the moisture content level comprises determining a differential measurement associated with the near-field radar.

19. The vegetative health device of claim 1,
wherein the three-dimensional map determined based at least in part on a first portion of the sensor data is a topographical three-dimensional map including contour lines.

20. The vegetative health device of claim 19,
wherein the three-dimensional map fuses data from multiple types of sensors and/or inputs.

* * * * *